(12) United States Patent
Shaheen et al.

(10) Patent No.: US 8,023,941 B2
(45) Date of Patent: Sep. 20, 2011

(54) METHOD AND APPARATUS FOR INDEPENDENT AND EFFICIENT DELIVERY OF SERVICES TO WIRELESS DEVICES CAPABLE OF SUPPORTING MULTIPLE RADIO INTERFACES AND NETWORK INFRASTRUCTURE

(75) Inventors: Kamel M. Shaheen, King of Prussia, PA (US); Shamim Akbar Rahman, Montreal (CA); Steven Jeffrey Goldberg, Downingtown, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 1514 days.

(21) Appl. No.: 10/899,340

(22) Filed: Jul. 26, 2004

(65) Prior Publication Data

US 2005/0136898 A1    Jun. 23, 2005

Related U.S. Application Data

(60) Provisional application No. 60/530,195, filed on Dec. 17, 2003.

(51) Int. Cl.
*H04W 4/00* (2009.01)
(52) U.S. Cl. .......... 455/433; 455/432.1; 455/432.3; 370/338; 370/395.21; 370/395.42
(58) Field of Classification Search .......... 370/338, 370/395.21, 395.42; 455/432.1, 432.3, 433
See application file for complete search history.

(56) References Cited

U.S. PATENT DOCUMENTS

| | | | |
|---|---|---|---|
| 5,664,004 A | 9/1997 | Durchman et al. | |
| 5,862,480 A | 1/1999 | Wild et al. | |
| 6,169,893 B1 * | 1/2001 | Shaheen et al. | 455/414.1 |
| 6,768,726 B2 | 7/2004 | Dorenbosch et al. | |
| 6,934,530 B2 * | 8/2005 | Engelhart | 455/406 |
| 7,099,687 B1 * | 8/2006 | Makela et al. | 455/552.1 |
| 7,149,524 B2 | 12/2006 | Reynolds | |
| 7,257,122 B1 | 8/2007 | Keturi | |
| 2001/0036164 A1 | 11/2001 | Kakemizu et al. | |
| 2001/0036175 A1 | 11/2001 | Hurtta | |
| 2002/0025821 A1 | 2/2002 | Clapton et al. | |
| 2002/0152319 A1 | 10/2002 | Amin et al. | |
| 2002/0187780 A1 | 12/2002 | Souissi | |
| 2003/0095523 A1 | 5/2003 | Korus et al. | |
| 2003/0104816 A1 | 6/2003 | Duplessis et al. | |
| 2003/0125023 A1 | 7/2003 | Fishler | |
| 2004/0029587 A1 | 2/2004 | Hulkkonen et al. | |

(Continued)

FOREIGN PATENT DOCUMENTS

EP    1 051 054    11/2000

(Continued)

OTHER PUBLICATIONS

Salkintzis, Apostolis K. et al. "WLAN-GPRS Integration for Next-Generation Mobile Data Networks", IEEE Wireless Communications, Oct. 2002, pp. 112-114.

(Continued)

*Primary Examiner* — Temica M Beamer
(74) *Attorney, Agent, or Firm* — Volpe and Koenig, P.C.

(57) ABSTRACT

Independent delivery services to wireless terminals capable of supporting multiple radio interfaces is achieved through the employment of a service management center (SMC). The SMC determines the set of services and parameters based on the capability and service profile of the wireless terminal.

12 Claims, 3 Drawing Sheets

U.S. PATENT DOCUMENTS

2004/0122954 A1 6/2004 Shaheen
2005/0192021 A1 9/2005 Lee et al.

FOREIGN PATENT DOCUMENTS

| EP | 1 330 098 | 7/2003 |
|---|---|---|
| JP | 2003-303170 | 10/2003 |
| WO | 01/58177 | 8/2001 |
| WO | 02/15598 | 2/2002 |
| WO | 2004/064436 | 7/2004 |

OTHER PUBLICATIONS

3rd Generation Partnership Project; Technical Specification Group Services and System Aspects; 3GPP system to Wireless Local Area Network (WLAN) Interworking; Functional and architectural definition (Release 6); 3GPP TR 23.294 V1.0.0 (Aug. 2002).

Third Generation Partnership Project, "Technical Specification Group Services and System Aspects; Overall high level functionality and architecture impacts of flow based charging; Stage 2 (Release 6)," 3GPP TS 23.125 V6.1.0 (Jun. 2004).

Third Generation Partnership Project, "Technical Specification Group Services and System Aspects; Overall Architecture Aspects of IP Flow Based Bearer Level Charging; Stage 2 (Release 6)," 3GPP TR 23.825 V1.4.0 (Jan. 2004).

Third Generation Partnership Project, "Technical Specification Group Services and System Aspects; Overall Architecture Aspects of IP Flow Based Bearer Level Charging; Stage 2 (Release 6)," 3GPP TR 23.825 V1.1.0 (Nov. 2003).

* cited by examiner

METHOD AND APPARATUS FOR INDEPENDENT AND EFFICIENT DELIVERY OF SERVICES TO WIRELESS DEVICES CAPABLE OF SUPPORTING MULTIPLE RADIO INTERFACES AND NETWORK INFRASTRUCTURE

CROSS REFERENCE TO RELATED APPLICATION(S)

This application claims priority from U.S. provisional application No. 60/530,195 filed on Dec. 17, 2003, which is incorporated by reference as if fully set forth.

FIELD OF INVENTION

The present invention relates to wireless networks and more particularly to method and apparatus for delivering services to wireless terminals capable of supporting multiple radio interfaces and network infrastructures.

BACKGROUND

Wireless systems currently in use are mainly voice/services based. Supplemental services such as short message service (SMS), multimedia messaging service (MMS), instant messaging service (IMS) and the like have been deployed over wireless systems and generate significant revenues for the operators. This is complicated by the fact that these services are closely tied to specific technologies and network infrastructure and users may not be able to reach these services by way of another wireless access technology other than the one supported by the user's terminal.

Various wireless local area networks (WLANs) such as IEEE 802.11, and wireless metropolitan area networks (WMANs) such as IEEE 802.16 and 802.20 have been developed. While there are functional distinctions between WLANs and WMANs, "WLANs" as used herein are intended to include WLANs, WMANs and similar wireless networks. The development of the WLANs such as IEEE 802.11, 802.16 and 802.20 among others, the integration of such networks into existing wireless networks such as General Packet Radio Service (GPRS), universal mobile telecommunication system (UMTS), code division multiple access 2000 (CDMA 2000) to name just a few, together with the variety of wireless terminals that can support such technologies, it is advantageous to provide for independent delivery of such services to wireless terminals capable of supporting multiple radio interfaces and network infrastructures.

While these different services are typically separately accessed by the user, it is often the case where the availability of the services or type of service desired changes dynamically. In addition to changes in the type of data transferred by a single device such as transfer of data during a conversation, it is often the case that a user wishes to continue to communicate but wishes to change devices during a session. A simple example of this would be a user engaging in a live text message conversation session on fixed location computer, and then continuing the live text message conversation session while traveling. This sort of continuation of a single session would be particularly useful, for example, in cases where the session is being used in connection with maintenance and repair work, which may also include such functions as database access. Such changes of devices or communications services are difficult because the connections are substantially different in their configuration.

SUMMARY

According to the present invention, selection is made of a radio access technology (RAT) in a system which includes at least two networks having different RAT capabilities compatible with the RAT capabilities for communicating with a wireless transmit/receive unit (WTRU) having multiple RAT capabilities. The WTRU establishes a connection with said first network, which provides an address to the WTRU. A service management center (SMC) communicates with the WTRU and a service client/servers (SC/S). The WTRU registers with the SMC to receive services and the SMC having means for retrieving a user profile of the WTRU forwarded to said SMC and sending a request for capability of said WTRU. The WTRU responds to the request to provide information including a capability and a service profile to said SMC. The SMC responds to the information for determining services to be provided to the WTRU and activates the SC/S to provide the service. The SC/S provides an acknowledgement to the SMC responsive to the activation; and the SMC responds to the acknowledgment by providing an acknowledgment to the WTRU.

BRIEF DESCRIPTION OF THE DRAWINGS

The present invention will be understood for the consideration of the accompanying figures wherein like elements are designated by like numerals, and, wherein.

DETAILED DESCRIPTION OF THE PREFERRED EMBODIMENTS

Hereafter, a wireless transmit/receive unit (WTRU) includes but is not limited to a user equipment, mobile station, fixed or mobile subscriber unit, pager, or any other type of device capable of operating in a wireless environment. When referred to hereafter, a base station includes but is not limited to an access point (AP) such as an IEEE 802.11 access point, a Node B, site controller or any other type of interfacing device in a wireless environment.

The present invention provides method and apparatus for providing such independent delivery of such services to wireless terminals capable of supporting multiple radio interfaces through the employment of a service management center (SMC) 53, which determines the set of services and parameters based on the capability and service profile of the wireless terminal.

Figure 1:
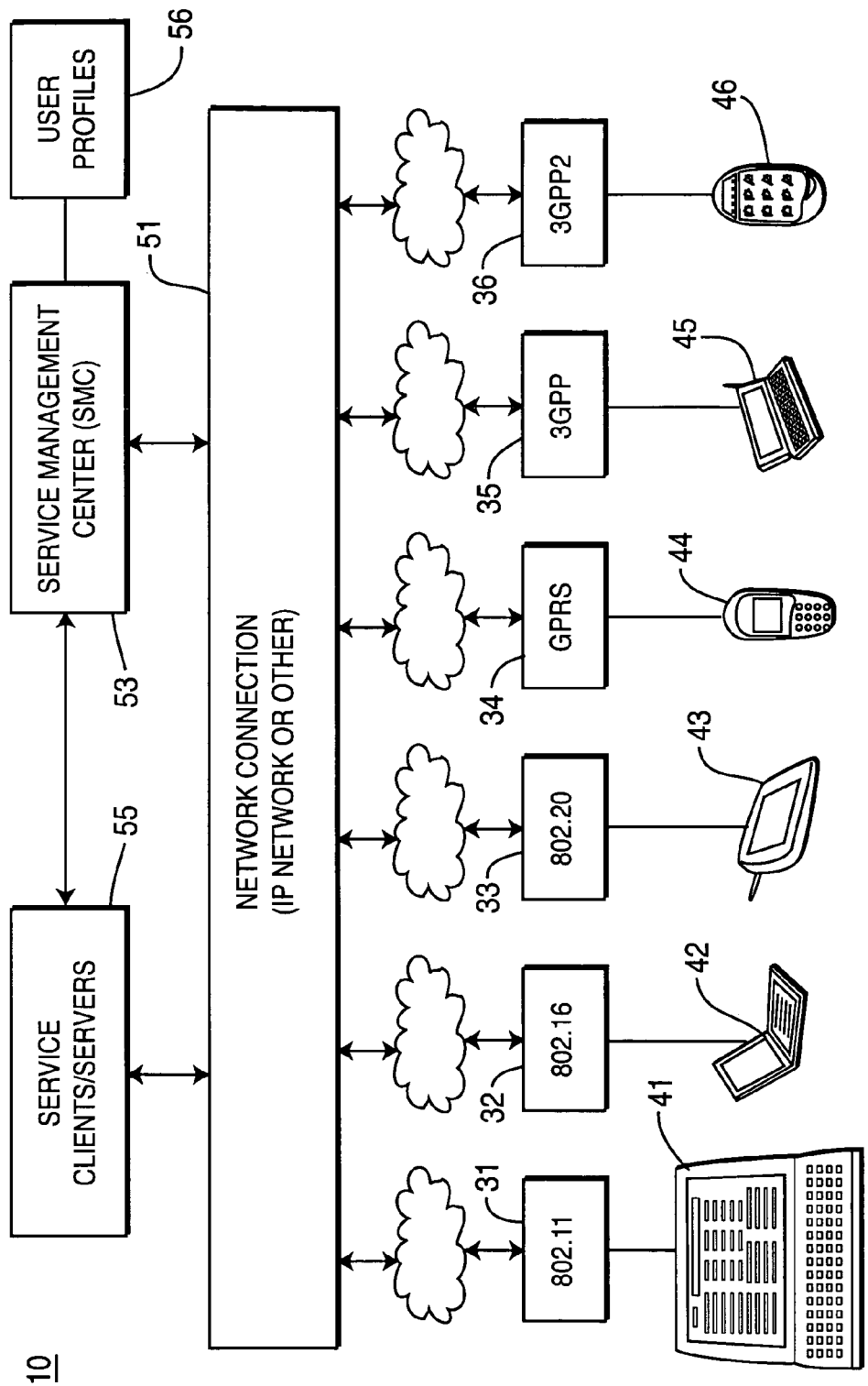
FIG. 1 is a network diagram showing a simplified schematic of the basic network architecture embodying the principles of the present invention.

FIG. 1 shows a network architecture 10 which embodies the principles of the present invention and is comprised of a plurality of air interfaces 31-36. Also shown are a plurality of WTRUs. The air interfaces 31-36 include WLANs 31-33 and other types of wireless networks 34-36. While one of each type is shown, it is presumed that multiple air interfaces of each type will generally be present.

The wireless networks include general packet radio service (GPRS) 33, a third generation partnership (3GPP) network 34 and a 3GPP 2 network 34, and are connected to the IP or other protocol network 51 through the wireless network with which it is associated and by way of a variety of transport protocol, such as internet protocol (IP) or X.25. These network implementations are given as examples, and it is understood that other types of network implementations may be used with the present invention.

The WLANs 31-33 are a plurality of type 802 WLANs or WMANs such as 802.11, 802.16 and 802.20 although it is contemplated that other types of WLAN connections can be used. Each of these WLANs 31-33 is capable of serving wireless terminals to illustrate, a laptop 41 equipped with an 802.11 compatible WLAN card connected via air interface of WLAN 31; two (2) types of personal digital assistants (PDAs) 42 and 43 connected via air interface of WLANs 32 and 43; a cellphone with data capabilities 45 connected via GPRS network 34; a cellphone PDA combination device 44 connected via 3GPP network 35; a cellphone 46 equipped with a screen for displaying video images connected via 3GPP2 network 36 are illustrated in FIG. 1. It is of course noted that multiple air interfaces of one or more types are likely to be employed, and multiple WTRUs 41-46 will likely be associated with each air interface.

The various air interfaces 31-36 connect to a network connection 51 which can be an IP network or other suitable network connection. This connection may incorporate the Internet or any other network available to one or more of the air interfaces 31-36.

A service management center (SMC) 53 is in communication with the air interfaces 31-36, either directly or through the network connection 51. The SMC 51 determines the set of services and parameters based on the capability and service profile of the WTRUs 41-44 (user profile 56). Service clients or servers (SC/S) 55 are a variety of communications functions available through the network connection 51 or directly through the air interfaces 31-36 such as shown by the connection to WLANs 31, 32. It is also possible to provide the SC/S functions 55 through the SMC 53 which provides the connection through the network connection 51. The SC/S can provide any of a variety of supplemental services, such as messaging services including SMS, MMS and IMS, voice over IP (VoIP) information and data retrieval services and entertainment services. Additional services provided by SC/S functions 55 can be particular information, data or entertainment services which may be provided independently of the user's primary service provider and independent of the SMC 53. In some cases, the optimum connection to the particular SC/S 55 can be independent of the SMC 53 while in other cases, the SMC 53 may be advantageously used to either connect the user to the SC/S 55 or to supervise a network connection between the SC/S 55 and the user.

Particular ones of the WTRUs 41-46 are capable of communicating with a globally available data network such as the general packet radio service (GPRS), a third generation partnership (3GPP) network or a 3GPP 2 network, through the wireless network with which it is associated and by way of a variety of transport protocols, such as internet protocol (IP) or X.25. The latter protocol provides a low speed packet switched data service. Alternatively, communication may be by way of specific service protocol such as SMS simple mail transfer protocol (SMTP) or a similar service. For example, the laptop 41 of FIG. 1 may communicate with the GPRS network 34 by way of the 802.11 WLAN 31 and an IP network which communicates with the service management center (SMC) 53 that provides an interface to various service clients/servers (SC/S).

The system architecture is such that the WTRUs 41-46 know of the existence of the SMC 53 and the SMC 53 can also be known to the wireless network that supports the WTRUs, such as the 802.11 network which supports device 12. Also, any of the WTRUs 41-46 may be interchangeably used with any of the WLANs 31-33 or wireless wide area network WWAN 34-36, when they are provided with the appropriate wireless communication interfaces.

The SMC 53 maintains an updated profile of the capabilities of the WTRU 41-46 which include: radio access technology (RAT) capabilities such as a global system for mobile communications/general packet radio service (GSM/GPRS), Bluetooth® and 802.11. If these basic capabilities change, the SMC 53 is notified. For example, when a user removes the 802.11 card which enables communication of the device with the 802.11 WLAN, the SMC 53 is notified and updates the profile 56. The WTRU's unavailability and connections to the networks may also be maintained in the profile 56, for example GSM-connected, GPRS-available, Bluetooth®-recently available and 802.11-unknown.

Additionally, information regarding various services may be maintained in the profile. These service factors include costs for the services and quality of service (QoS) of the services.

The wireless device, such as device 12 may contain a logical entity that communicates with the SMC 53 at the network side. This entity may be embedded in device 12 or included in a universal integrated circuit card (UICC).

Initially, the WTRU 41-46, is connected using one of the wireless networks 31-36. The user requests a set of services compatible with his/her service profile, terminal capabilities, such as processing power, memory availability, screen size and type (i.e. color, black and white) and the like, and the access technology of the device, such as, for example, bandwidth, bit rate, QoS and the like. The SMC, when contacted by either the WTRU 41-46, or an external entity trying to access the WTRU 41-46, ascertains the best approach to RAT usage. For example, if access is made by way of a GPRS network 34 when an 802.11 WLAN network 31 is also available and meets the service criteria, the WTRU 41-46, requests establishment of an 802.11 connection. The GPRS is either dropped or maintained. The WTRU 41-46 alternatively has simultaneous access by way of multiple RATs, and the SMC 53 may direct/switch traffic between these multiple RATs. In some cases the SMC 53 may request the WTRU 41-46 to establish certain RAT connections when the status is unknown based on latency requirements.

In the event that a user elects to move to a different technology coverage area, the user updates current status of the WTRU 41-46. The user sends the update to the SMC 53. The SMC 53 updates the service profile and forwards the request to the SC/S 55 to potentially adjust the media/service parameters to accommodate the new environment and terminal capability.

If the service is adjusted, the SC/S 55 acknowledges the changes to the SMC 53 whereupon the SMC 53 acknowledges the changes and sends an acceptance report to the WTRU 41-46. Depending on circumstances and calling source, the SMC 53 may decide to switch RAT 56 (hand off between RATs). The SMC 53 may instruct the WTRU 41-46 to switch to a specific connection or to drop the current connection and to expect establishment of a new connection.

Similarly, the user engaged in a session may wish to transfer the session to a different WTRU (WTRUs 41-46). In that instance, the session is established with a first device, for example WTRU 41. The user may then determine it convenient to physically move away from WTRU 41 but continue the session using a different WTRU such as PDA 43. The session can be transferred to the PDA 43. If necessary, the SMC 53 can transfer the service 55 either to another network connection 51 or through a connection via the SMC 53.

Likewise the session can originate with communications through the SMC 53 and continue either through the SMC 53 or through another network connection 51. In cases where the connection to a SC/S 55 is established directly through the network connection 51, the SMC 53 may still be used to control the transfer. This is different from a handoff of a single WTRU 41-46 to a different service 31-36 in that the handoff is from one WTRU to a different WTRU 43, in this case from WTRU 41 to WTRU 43. Since the services 55 provided through network connections 51 is separate from the service management function 53, the user's ability to use networked services is enhanced.

Figure 2:
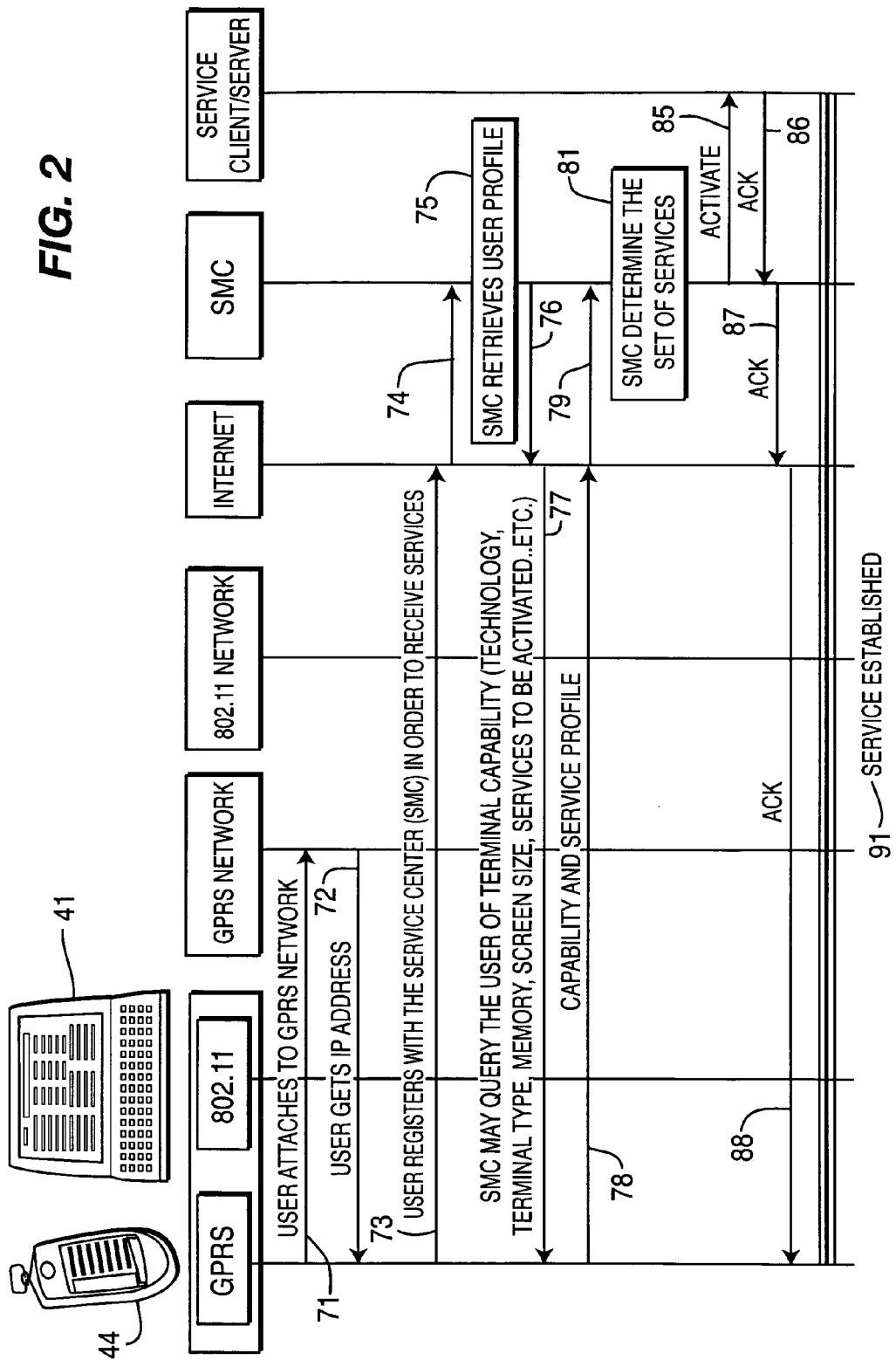
FIGS. 2 and 3 are diagrams showing the sequence of service registration, showing exemplary routines employed for establishing the appropriate service.

FIG. 2 is a diagram showing a sequence of an exemplary service registration using a GPRS networking 34. In FIG. 2, a user has a WTRU, such as a laptop 41 or cell phone 44, capable of supporting communications by 802.11 and GPRS. The WTRU 41, 44 acting as a GPRS WTRU 45 attaches to the GPRS network 34 (step 71). The GPRS network 34 acquires the address of the WTRU 45 (step 72). The WTRU 45 registers with the SMC 53 in order to receive services (step 73), and is connected with the SMC 53 through the Internet 46, which conveys the registration to the SMC 53 (step 74). The user profile, which is stored at the SMC, is retrieved (step 75) and the SMC 53 queries the user regarding terminal capabilities of the WTRU 45 which, for example, include technology-terminal type, screen size, services to be activated and the like. The query (step 76) is directed to the internet and conveyed (step 77) to the WTRU 45. The user, responsive thereto, provides the capability and service profile (step 78), which is transmitted through the Internet in order to be conveyed to the SMC 53 (step 79).

The SMC 53 determines the set of services (step 81), and activates the SC/S 55 (step 85) which sends an acknowledgement to the SMC 53 (step 86). This acknowledge (ACK) is transferred by the SMC through the Internet (step 87), and to the user device (step 88), whereupon service is established (step 91). The service established may be supported by the GPRS network 40 or the WTRU 45 may be switched to another network, such as an 802.11 network 31.

Figure 3:
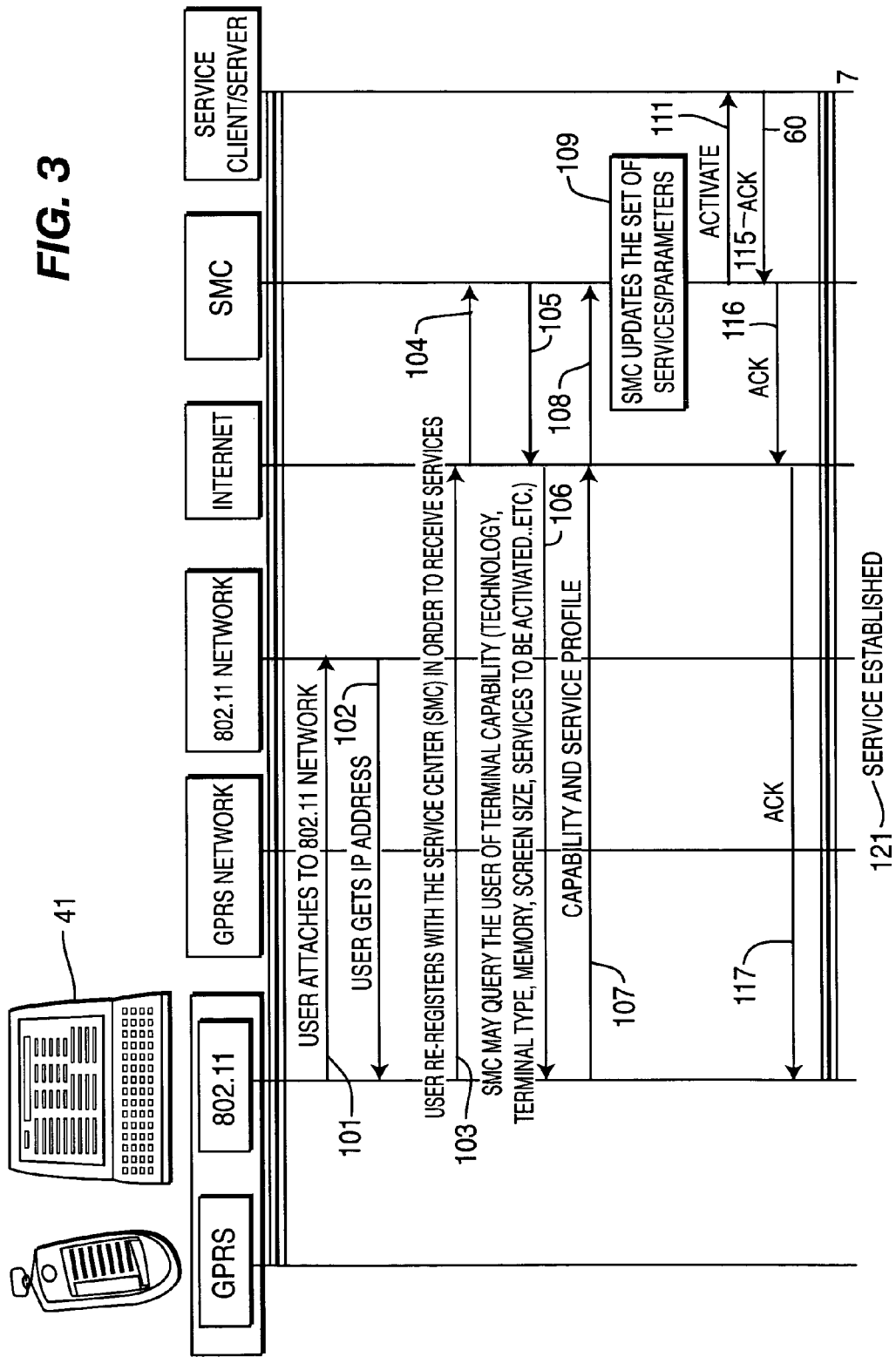

FIG. 3 is a diagram showing a sequence of an exemplary service registration using an IEEE 802.11 network 31. The WTRU 45 connects with the 802.11 network 31, (step 101). The 802.11 network 31 obtains the IP address of the WTRU 45 (step 102). The WTRU 45 re-registers with the SMC 53 (step 103) for purposes of updating the services, the SMC 53 receiving the communication by way of the internet 46 (step 104), and queries the user regarding terminal capabilities (steps 105-106), such as, for example, technology, terminal type, memory, screen size, services to be activated and so forth. The WTRU 45, responsive to the aforesaid query provides a capability and service profile (step 107) which is conveyed to the SMC 53 by way of the Internet (step 108). The SMC 53 updates the set of services/parameters (step 109) and activates the SC/S 55 (step 111). The SC/S 55 transmits an acknowledgement (ACK) to the SMC 53 (step 115) which transmits an acknowledgement (ACK) (step 115) which is in turn conveyed to the wireless device 41 through the Internet (step 116) and through the network (step 117), whereby service is established (step 121).

As described above, the SMC 53, depending upon the capability of the WTRU 45 and the required services, may switch the wireless device to another network, for example, switching the wireless device from the 802.11 WLAN to the GPRS, or vice versa, or retains service on both the WLAN and GPRS networks.

Although the embodiments of FIGS. 2 and 3 show a GPRS network 34 and a WLAN network 31, it can be applied to any wireless networks, such as GPRS, 3GPP, future 4G and the like.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for use in a service management function in a wireless network, the method comprising:
receiving a first message indicating a request for a service for a wireless transmit/receive unit (WTRU) and a type of access network through which the WTRU is connected;
determining that the WTRU should receive the service based on the type of access network through which the WTRU is connected and a Quality of Service (QoS) requirement associated with the service; and
transmitting a second message to establish the service for the WTRU.

2. The method of claim 1, further comprising:
maintaining a profile associated with the WTRU;
wherein the determining that the WTRU should receive the service is further based on the profile.

3. The method of claim 2, wherein the profile associated with the WTRU includes information related to radio access technology capabilities of the WTRU.

4. The method of claim 2, further comprising:
receiving a third message indicating that the WTRU has changed access networks; and
determining whether to modify the service based on the third message.

5. The method of claim 4, further comprising:
updating the profile associated with the WTRU based on the third message.

6. The method of claim 1, wherein the service is a messaging service, a short message service (SMS), a multimedia message service (MMS), and internet protocol (IP) multimedia subsystem (IMS) service, a voice over IP (VoIP) service, a data retrieval service, or an entertainment service.

7. A service management function comprising:
a circuit configured to receive a first message indicating a request for a service for a wireless transmit/receive unit (WTRU) and a type of access network through which the WTRU is connected;
a circuit configured to determine that the WTRU should receive the service based on the type of access network through which the WTRU is connected and a Quality of Service (QoS) requirement associated with the service; and
a circuit configured to send a second message to establish the service for the WTRU.

8. The service management function of claim 7, further comprising:
a circuit configured to maintain a profile associated with the WTRU;
wherein the circuit configured to determine that the WTRU should receive the service is configured to determine that the WTRU should receive the service further based on the profile.

9. The service management function of claim 8, wherein the profile associated with the WTRU includes information related to radio access technology capabilities of the WTRU.

10. The service management function of claim 8, further comprising
  a circuit configured to receive a third message indicating that the WTRU has changed access networks; and
  a circuit configured to determine whether to modify the service based on the third message.

11. The service management function of claim 10, further comprising:
  updating the profile associated with the WTRU based on the third message.

12. The service management function of claim 7, wherein the service is a messaging service, a short message service (SMS), a multimedia message service (MMS), and internet protocol (IP) multimedia subsystem (IMS) service, a voice over IP (VoIP) service, a data retrieval service, or an entertainment service.

* * * * *

UNITED STATES PATENT AND TRADEMARK OFFICE
CERTIFICATE OF CORRECTION

| | | |
|---|---|---|
| PATENT NO. | : 8,023,941 B2 | Page 1 of 1 |
| APPLICATION NO. | : 10/899340 | |
| DATED | : September 20, 2011 | |
| INVENTOR(S) | : Shaheen et al. | |

It is certified that error appears in the above-identified patent and that said Letters Patent is hereby corrected as shown below:

ON THE TITLE PAGE

Item (56) OTHER PUBLICATIONS, page 2, right column, after "V1.1.0 (Nov. 2003)." insert --3rd Generation Partnership Project; Technical Specification Group Services and System Aspects; 3GPP system to Wireless Local Area Network (WLAN) Interworking; Functional and architectural definition (Release 6); 3GPP TR 23.934 V1.0.0 (2002-08).--.

IN THE CLAIMS

At Claim 6, column 6, line 44, after "(MMS),", delete "and" and insert --an--.

At Claim 10, column 7, line 7, after "comprising" insert --:--.

At Claim 12, column 8, line 7, after "(MMS),", delete "and" and insert --an--.

Signed and Sealed this
Thirty-first Day of January, 2012

David J. Kappos
*Director of the United States Patent and Trademark Office*